UNITED STATES PATENT OFFICE.

FRITZ ACH, OF MANNHEIM, GERMANY, ASSIGNOR TO C. F. BOEHRINGER & SOEHNE, OF WALDHOF, GERMANY.

PROCESS OF OBTAINING CINNAMIC ALDEHYDE.

SPECIFICATION forming part of Letters Patent No. 581,053, dated April 20, 1897.

Application filed August 8, 1896. Serial No. 602,180. (No specimens.)

*To all whom it may concern:*

Be it known that I, FRITZ ACH, a citizen of Germany, residing at Mannheim, Germany, have invented certain new and useful Improvements in the Art of Obtaining Cinnamic Aldehyde; and I do hereby declare the following to be a full, clear, and exact description of the invention, such as will enable others skilled in the art to which it appertains to make and use the same.

This invention relates to the art of obtaining cinnamic aldehyde; and its object is to provide a method whereby this compound may be synthetically produced on an economical and commercial scale.

With this object in view the said invention consists in the method, combination of steps, and features which will be set forth hereinafter and then pointed out in the claims hereunto appended.

Cinnamic aldehyde has been synthetically produced from benzaldehyde and acetic aldehyde by Peine, and the process is described in *Berichte der Deutschen Chemischen Gesellschaft*, Vol. 17, p. 2109. Under that process Glaissen's method of condensation is employed, a mixture of benzoic aldehyde and acetic aldehyde being treated with a very dilute aqueous solution of soda-lye as a condensing agent. In order to make the condensation successful, it is necessary under this process to keep the mixture at a temperature of about 30° centigrade for from eight to ten days and to frequently shake the same. This method cannot be carried out practically, for, aside from the fact that it involves the handling of very large quantities of liquid, it is objectionable for the reason that the yield of pure cinnamic aldehyde is very small, which is probably due to the fact that under the protracted action of the alkali and the continued, though moderate, heat the by far greater portion of the cinnamic aldehyde is converted into a tough reddish-yellow resin. I have found that this conversion of cinnamic aldehyde into a resinous substance may be avoided and the synthetic production of the aldehyde made practically valuable by employing a highly-concentrated alkali for the condensing reagent instead of the dilute alkali hitherto employed, and by avoiding the heating of the mixture during the process by thoroughly cooling the same by ice-water or a cooling mixture. Under this method the condensation is completed in a short time, the actual yield of cinnamic aldehyde being as much as eighty per cent. of the theoretical amount.

It is preferable, though not indispensable, to employ an alcohol such as methyl or ethyl alcohol as a solvent for the purpose of attaining a more perfect mixing of the aldehydes with the alkali or lye.

In illustration of my invention the following example is given: I take five parts by weight of benzaldehyde and four parts by weight of acetic aldehyde and dissolve them in ten parts by weight of alcohol and then reduce the temperature of the solution to 10° centigrade by means of a cooling mixture. I then cause ten parts by weight of soda-lye, which has also been previously cooled by a cooling mixture, to flow into the solution during the space of from five to ten minutes, the solution being shaken or agitated at the same time. After a short time (about ten minutes after having added the alkali) a clear solution results. The mixture of reagents is then allowed to remain under the influence of the cooling mixture for from fifteen to twenty minutes and is then diluted with water. The oil which is separated out is then taken up with ether. The ether solution is then evaporated and the residue is finally distilled *in vacuo*. In the course of this distillation pure cinnamic aldehyde passes over as a golden-yellow liquid at eleven millimeters pressure between 120° and 125° centigrade.

Instead of a concentrated alkali solution may be employed an aqueous solution of soda of potash, basic sodium phosphate, calcium hydroxid, and barium hydroxid; but the actual yield of cinnamic aldehyde is not so good as with the concentrated alkali solution.

What I claim, and desire to secure by Letters Patent, is—

1. The process of obtaining cinnamic aldehyde, which consists in treating a mixture of benzaldehyde and acetic aldehyde with a concentrated alkali, substantially as set forth.

2. The process of obtaining cinnamic aldehyde, which consists in treating a mixture of benzaldehyde and acetic aldehyde with a concentrated lye at a low temperature, substantially as set forth.

3. The process of obtaining cinnamic aldehyde, which consists in dissolving benzaldehyde and acetic aldehyde in an alcohol and cooling and then adding a concentrated lye to the solution, substantially as set forth.

4. The process of obtaining cinnamic aldehyde, which consists in dissolving benzaldehyde and acetic aldehyde in alcohol and cooling the solution to a low temperature, and then pouring concentrated soda-lye into the solution while agitating, all substantially as and in the proportions set forth.

In testimony whereof I affix my signature in presence of two witnesses.

FRITZ ACH.

Witnesses:
   JAKOB LANGENWALTER,
   LORENZ ACH.